(12) United States Patent
Park et al.

(10) Patent No.: US 7,679,239 B2
(45) Date of Patent: Mar. 16, 2010

(54) FLAT TYPE VIBRATING MOTOR

(75) Inventors: Young Il Park, Gwangju (KR); Sung Hwan An, Gwangju (KR)

(73) Assignee: LG Innotek Co., Ltd., Seoul (KR)

( * ) Notice: Subject to any disclaimer, the term of this patent is extended or adjusted under 35 U.S.C. 154(b) by 489 days.

(21) Appl. No.: 11/593,562

(22) Filed: Nov. 7, 2006

(65) Prior Publication Data

US 2007/0103016 A1 May 10, 2007

(30) Foreign Application Priority Data

Nov. 7, 2005 (KR) .................. 10-2005-0106111

(51) Int. Cl.
*H02K 33/00* (2006.01)
(52) U.S. Cl. ........................ 310/81; 310/184
(58) Field of Classification Search ............... 310/81, 310/156.32–156.37, 184
See application file for complete search history.

(56) References Cited

U.S. PATENT DOCUMENTS 4,724,350 A * 2/1988 Shiraki et al. ............... 310/268
6,700,250 B2 * 3/2004 Miyasaka .................... 310/81
2004/0051400 A1 3/2004 Yamaguchi
2004/0104631 A1 * 6/2004 Noguchi ...................... 310/81
2006/0022537 A1 * 2/2006 Yamaguchi et al. ........... 310/81
2006/0028077 A1 2/2006 Yamaguchi et al.

FOREIGN PATENT DOCUMENTS

| JP | 2002-142427 A | 5/2002 |
| JP | 2004-129319 A | 4/2004 |
| JP | 2004-147468 A | 5/2004 |
| JP | 2006-80869 A | 3/2006 |
| KR | 10-2004-0060154 A | 7/2004 |

* cited by examiner

*Primary Examiner*—Burton Mullins
(74) *Attorney, Agent, or Firm*—Birch, Steweart, Kolasch & Birch, LLP

(57) ABSTRACT

Provided is a flat type vibrating motor capable of reducing a consumed current of the motor while maintaining torque of the motor, lengthening even more an operating time of an apparatus such as a mobile communication apparatus in which the flat type vibrating motor is mounted, and shortening a charging period. At least one auxiliary coil separated at a predetermined mechanical degree with respect to a center of the primary coil mounted on the substrate, and series-connected to the primary coil is provided, so that a current flowing through the coil is reduced and torque equivalent to or greater than that of a related art motor can be obtained. Accordingly, an amount of a consumed current of the motor is reduced.

17 Claims, 4 Drawing Sheets

FLAT TYPE VIBRATING MOTOR

BACKGROUND OF THE INVENTION

1. Field of the Invention

The present invention relates to a flat type vibrating motor, and more particularly, to a flat type vibrating motor suitably applied to an apparatus operated by a battery.

2. Description of the Related Art

As mobile communication apparatuses becomes slim and are miniaturized recently, a flat type vibrating motor generally used becomes slim gradually.

Under this trends, crucial objects of the flat type vibrating motor is to reduce a volume of the flat type vibrating motor itself in order to reduce a volume of the mobile communication apparatus, and to reduce power consumption in order to lengthen life of the battery mounted within the mobile communication apparatus.

To achieve the above-mentioned objects, Japanese Patent Publication No. 2004-147468 (a patent document 1) is known as an alternative capable of reducing a volume of a flat type vibrating motor itself and obtaining sufficient strength.

FIG. 1 is a vertical cross-sectional view of the flat type vibrating motor disclosed in the above Japanese Patent, and FIG. 2 is a horizontal cross-sectional view of FIG. 1.

Referring to FIGS. 1 and 2, the vibrating motor 10 includes a lower cover 11 and an upper cover 13 coupled to each other to constitute a predetermined space in an inside of the vibrating motor 10. A lower portion and an upper portion of a shaft 15 are supported by the lower cover 11 and the upper cover 13.

A stator base 17 is disposed on the lower cover 11, and a coil 19 adheres on the stator base 17. Also, a bearing 21 is provided on an outer periphery of the shaft 15. An eccentric rotor yoke 23 is fixed on an outer periphery of the bearing 21. Also, a magnet 25 and a weight 27 are provided on a lower surface of the rotor yoke 23.

With this construction, when a current is supplied to the coil 19, the magnet 25, the weight 27, and the rotor yoke 23 are rotated by interaction between the coil 19 and the magnet 25, and vibration is generated by eccentricity caused by the weight 27.

In this flat type vibrating motor, a control integrated circuit (IC) 30 and a Hall device 20 are disposed inside a case on the stator base 17, and a six pole-magnet 25 and two coils 19 are series-connected.

Meanwhile, since a thickness of the coil 19 has a thin thickness of 0.5-0.6 mm, and particularly, the magnet 25 has a thin thickness of 0.4-0.5 mm to achieve a slim profile of the vibrating motor 10, a Nd—Fe—B bonding magnet is applied instead of a Nd—Fe—B sinter magnet. However, since the Nd—Fe—B bonding magnet has a lower magnetic flux density than that of the Nd—Fe—B sinter magnet, a two-coil driving type vibrating motor has problems of weak torque and a limitation in reducing a consumed current.

In detail, torque of the vibrating motor is proportional to product of the number of the coil's wiring and a consumed current. When torque is reduced with a constant number of the coil's wiring, a consumed current can be reduced. However, when torque is reduced, an amount of vibration is reduced, which is not preferable.

A related art vibrating motor has a problem of constantly consuming a driving current of about 80-85 mA in order to obtain torque of a predetermined level or more. This excessive driving current of the vibrating motor accelerates battery consumption of a mobile communication apparatus, reducing an operating time of a mobile communication apparatus.

Of course, a method of increasing the number of wirings wound on the coil can be proposed. However, when the number of the wirings wound on the coil is increased, a volume of the vibrating motor itself is increased, which is not preferable.

SUMMARY OF THE INVENTION

Accordingly, the present invention is directed to a flat type vibrating motor that substantially obviates one or more problems due to limitations and disadvantages of the related art.

An object of the present invention is to provide a flat type vibrating motor capable of reducing a consumed current of the vibrating motor while maintaining torque of the vibrating motor, and thus further lengthening an operating time of an apparatus (e.g., a mobile communication apparatus) in which the vibrating motor is mounted.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a flat type vibrating motor including: a lower cover for protecting a lower portion of the motor; an upper cover for protecting an upper portion of the motor; a shaft supported by the lower cover and the upper cover; a rotor supported by the shaft and having an eccentric center of gravity; a magnet fixed on the rotor; a substrate provided on an upper surface of the lower cover; a Hall device for detecting rotation of the magnet; a control integrated circuit for controlling power in response to a detecting signal of the Hall device; a plurality of primary coils for receiving power under control of the control integrated circuit; and at least one auxiliary coil disposed at a predetermined mechanical degree with respect to at least one of the primary coils and series-connected with the primary coil.

In another aspect of the present invention, there is provided a flat type vibrating motor including: a cover for protecting an appearance; an upper cover for protecting an upper portion of the motor; a shaft supported by a lower cover and the upper cover; a rotor supported by the shaft and having eccentricity; a bearing intervening between the shaft and a contact portion of the rotor; a magnet fixed on the rotor; a substrate provided on an upper surface of the lower cover; a primary coil for receiving power from the substrate; and at least one auxiliary coil series-connected to the primary coil and reducing a current flowing through the primary coil.

According to the present invention, it is possible to lengthen an operating time of a product such as a mobile communication apparatus in which a vibrating motor is installed by reducing a consumed current of the vibrating motor, and to achieve sufficient strength with a small volume.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Figure 1:
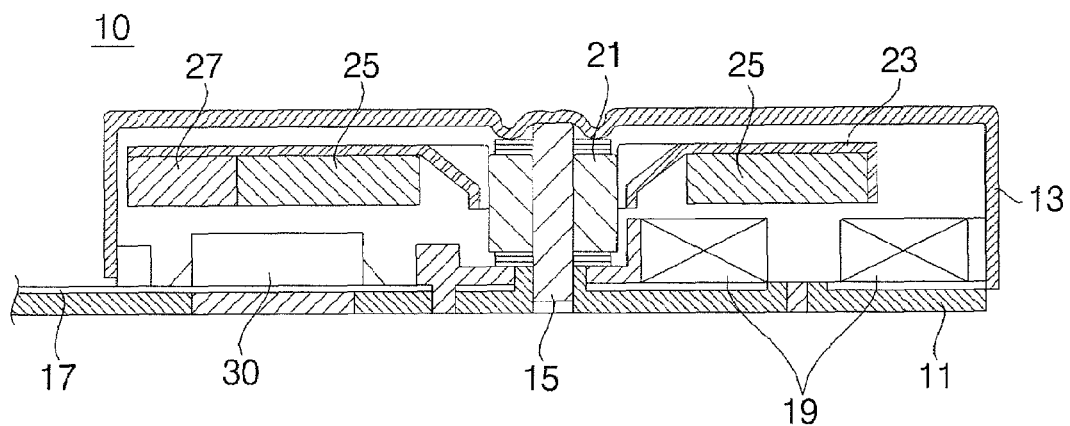
FIG. 1 is a vertical cross-sectional view of the flat type vibrating motor disclosed in the patent document 1.
Figure 2:
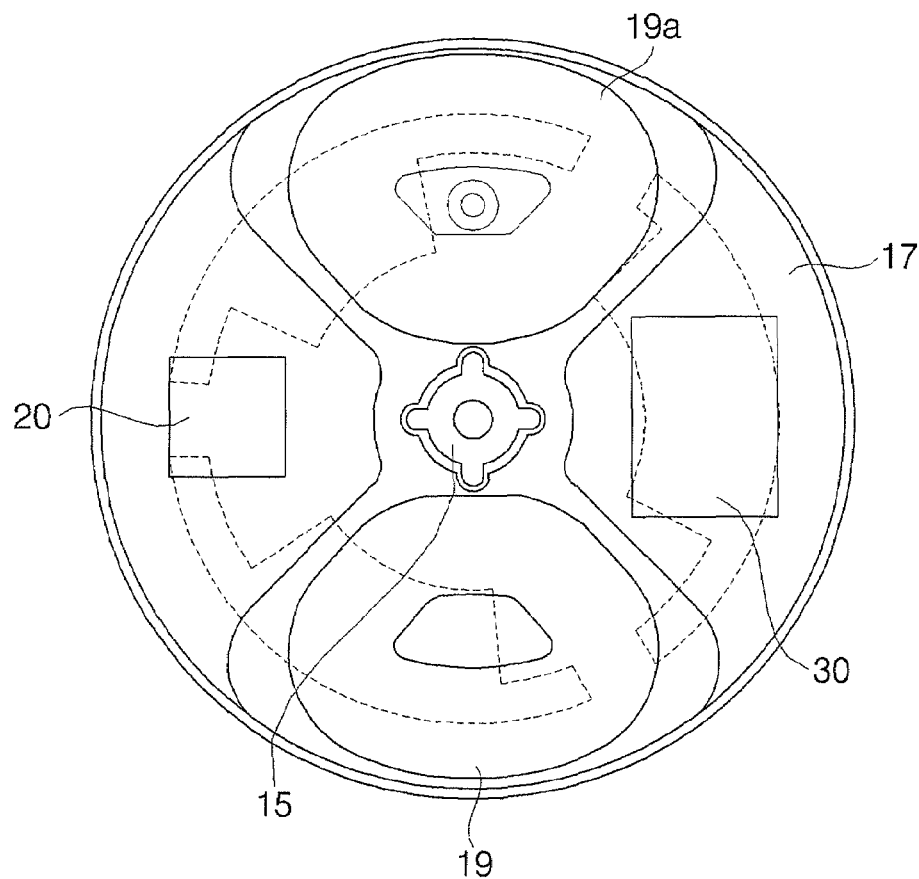
FIG. 2 is a horizontal cross-sectional view of FIG. 1.
Figure 3:
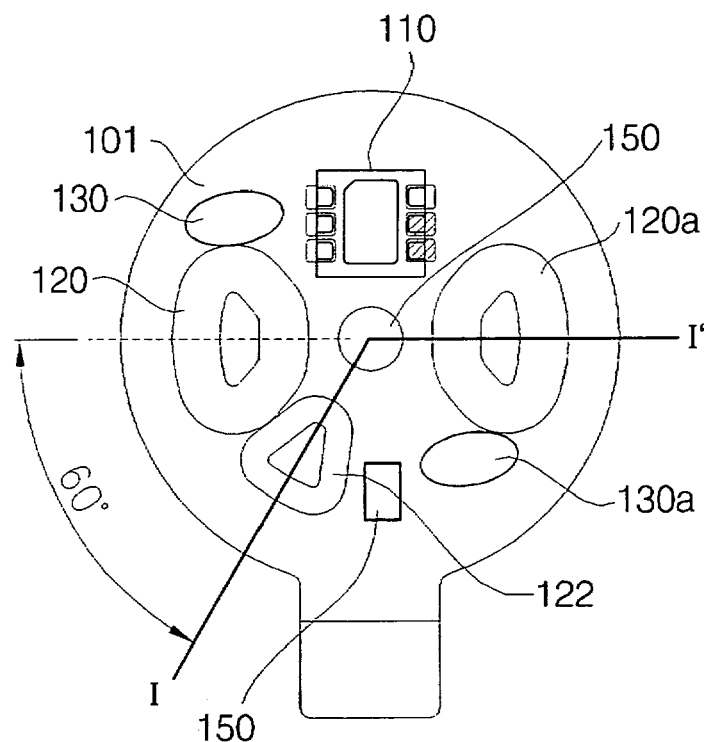
FIG. 3 is a horizontal cross-sectional view of a flat type vibrating motor according to the present invention.
Figure 4:
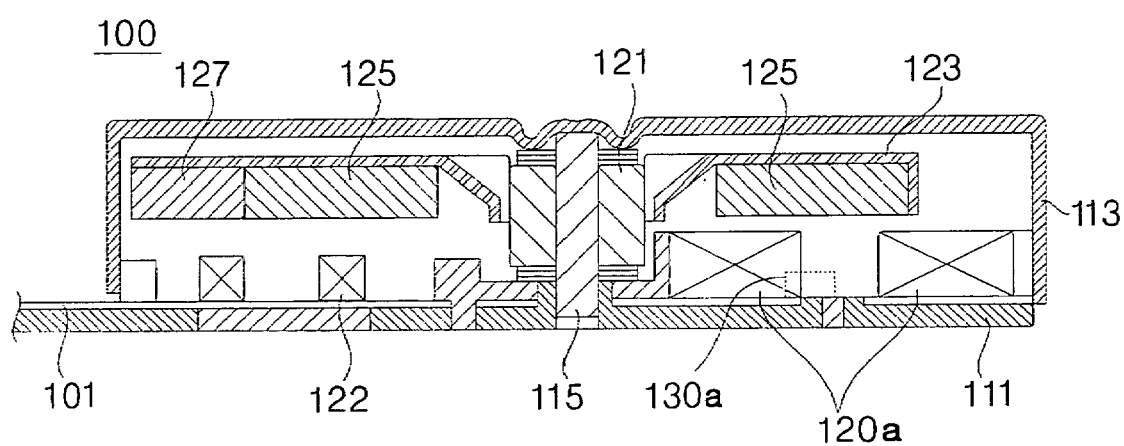
FIG. 4 is a vertical cross-sectional view, taken along a line I-I', of the flat type vibrating motor according to the present invention.

FIG. 3 is a horizontal cross-sectional view of a flat type vibrating motor according to the present invention, and FIG. 4 is a vertical cross-sectional view, taken along a line I-I', of the flat type vibrating motor according to the present invention.

Referring to FIGS. 3 and 4, the vibrating motor 100 includes a lower cover 111 and an upper cover 113 constituting a space for accommodating parts in an inside of the motor. A lower end and an upper end of a shaft 150 are supported by the lower cover 111 and the upper cover 113, respectively.

A circuit board 101 is provided on an upper surface of the lower cover 111, primary coils 120 and 120a are fixed on an upper surface of the circuit board 101. Also, a bearing 121 is provided on an outer periphery of the shaft 150 to allow the shaft 150 to swiftly rotate. A rotor yoke 123 that is biased by a predetermined weight 127 is fixed on an outer periphery of the bearing 121. Also, a magnet 125 and a weight 127 are provided on a lower surface of the rotor yoke 123. The weight 127 can be provided as a separate member formed of tungsten and can be realized by a shape of rotor having geometrical eccentricity.

Also, a control integrated circuit (IC) 110 and a Hall device 150 are mounted on the circuit board 101. The primary coils 120 and 120a are arranged on positions separated at a mechanical degree of 90° around the control IC 110, that is, on both sides separated 90° from each other around the shaft 150.

Also, detent torque generating units 130 and 130a are installed adjacently on and under the primary coils 120 and 120a on the circuit board 101 in order to generate detent torque. The detent torque means torque generated when torque is forcibly applied to the rotor from the outside to cause an angle displacement. The detent torque is torque forcibly provided in order to allow torque to be generated even in an interval where torque is not generated in a motor driven in a single phase. For this purpose, the detent torque generating units 130 and 130a can be formed of a magnetic steel plate.

Meanwhile, an auxiliary coil 122 series-connected to the primary coils 120 and 120a is further installed according to an embodiment of the present invention. A center of the auxiliary coil 122 is disposed at a mechanical degree of substantially 60° below a center of the primary coils 120 and 120a. This is to correspond to the magnet 125 with six poles.

According to the flat type vibrating motor having the above-described structure, when power is applied from the outside, the rotor is rotated by electromagnetic force generated between the primary coils, the auxiliary coil, and the magnet. At this point, controlling rotation of the vibrating motor is performed by a magnetic state of the magnet detected by the Hall device 150 and a control operation of the control IC 110 using the magnetic state. Also, since the detent torque generating units 130 and 130a are provided, rotation of the rotor can be swiftly performed even in a dead point area where on substantial torque exists.

Figure 5:
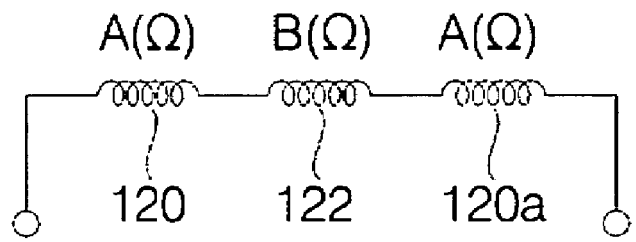
FIG. 5 is a diagram of an equivalent circuit mainly directed to the coil of FIG. 4.

Meanwhile, according to a series connection of the primary coils 120 and 120a and the auxiliary coil 122 of the present invention, an equivalent circuit of the coil is given as illustrated in FIG. 5. At this point, assuming that each resistance of the primary coils 120 and 120a is A (Ω) and resistance of the auxiliary coil 122 is B(Ω), total resistance is 2A+B (Ω), so that a consumed current at the same voltage is reduced.

Also, when this consideration is observed in an aspect of the vibrating motor's torque, the torque is proportional to product of the number of conductors and a current as shown in Equation 1.

$$T \propto Z \times I \qquad \text{Equation 1}$$

where T is torque, Z is the number of conductors, and I is a current.

In Equation 1, the number of the conductors is twice greater than the number of turns of wirings.

Referring to Equation 1, even when a current applied to the vibrating motor is reduced, the number of conductors, that is, the number of turns of wirings increases. Consequently, torque can be maintained to the same level as in the related art. Therefore, since a consumed amount of a current reduces, power consumption of a product such as a mobile communication apparatus in which the vibrating motor is installed is reduced. Accordingly, an operating time of the product can be lengthened as much as that.

Figure 6:
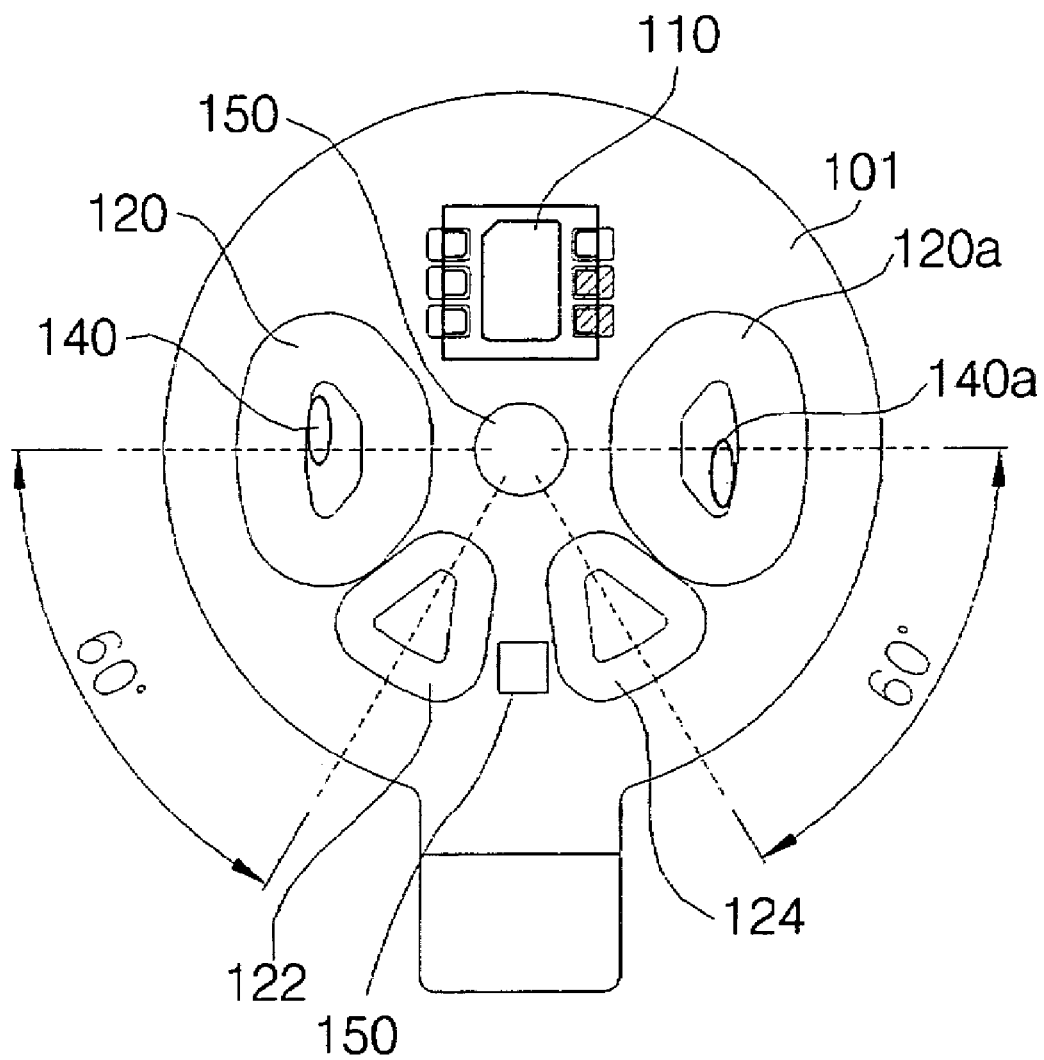
FIG. 6 is a horizontal cross-sectional view of a flat type vibrating motor according to another embodiment of the present invention.

FIG. 6 is a horizontal cross-sectional view of a flat type vibrating motor according to another embodiment of the present invention. In another embodiment, parts different from those of the previous embodiment will be described in detail, and other parts will use the descriptions of the corresponding parts of the previous embodiment.

Referring to FIG. 6, auxiliary coils 122 and 124 having a center located at a mechanical degree of 60° below a center of primary coils 120 and 120a and series-connected with the primary coils 120 and 120a are installed. Also, detent torque generating units 140 and 140a are installed in inner spaces of the primary coils 120 and 120a, respectively. The detent torque generating units 140 and 140a are provided inside the primary coils 120 and 120a, considering that an installation space is narrow because the pair of auxiliary coils 122 and 124 are installed inside the vibrating motor.

Figure 7:
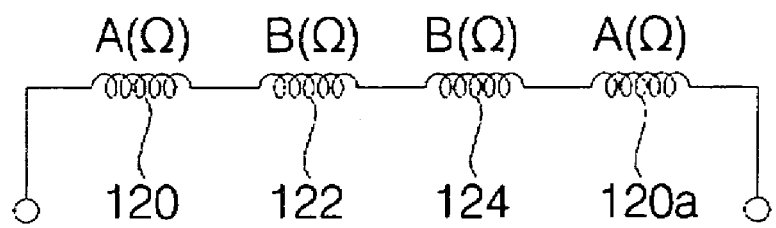
FIG. 7 is a diagram of an equivalent circuit mainly directed to the coil of FIG. 6.

An equivalent circuit by a connection line of the primary coils 120 and 120a and the auxiliary coils 122 and 124 is illustrated in FIG. 7. At this point, assuming that each resistance of the primary coils 120 and 120a is A (Ω) and each resistance of the auxiliary coils 122 and 124 is B(Ω), total resistance is 2A+2B (Ω) so that a consumed current at the same voltage is reduced even more compared to the previous embodiment.

Therefore, even when a current applied to the vibrating motor is reduced even more, the number of turns of wirings increases, so that torque can be maintained to the same level as in the related art.

Figure 8:
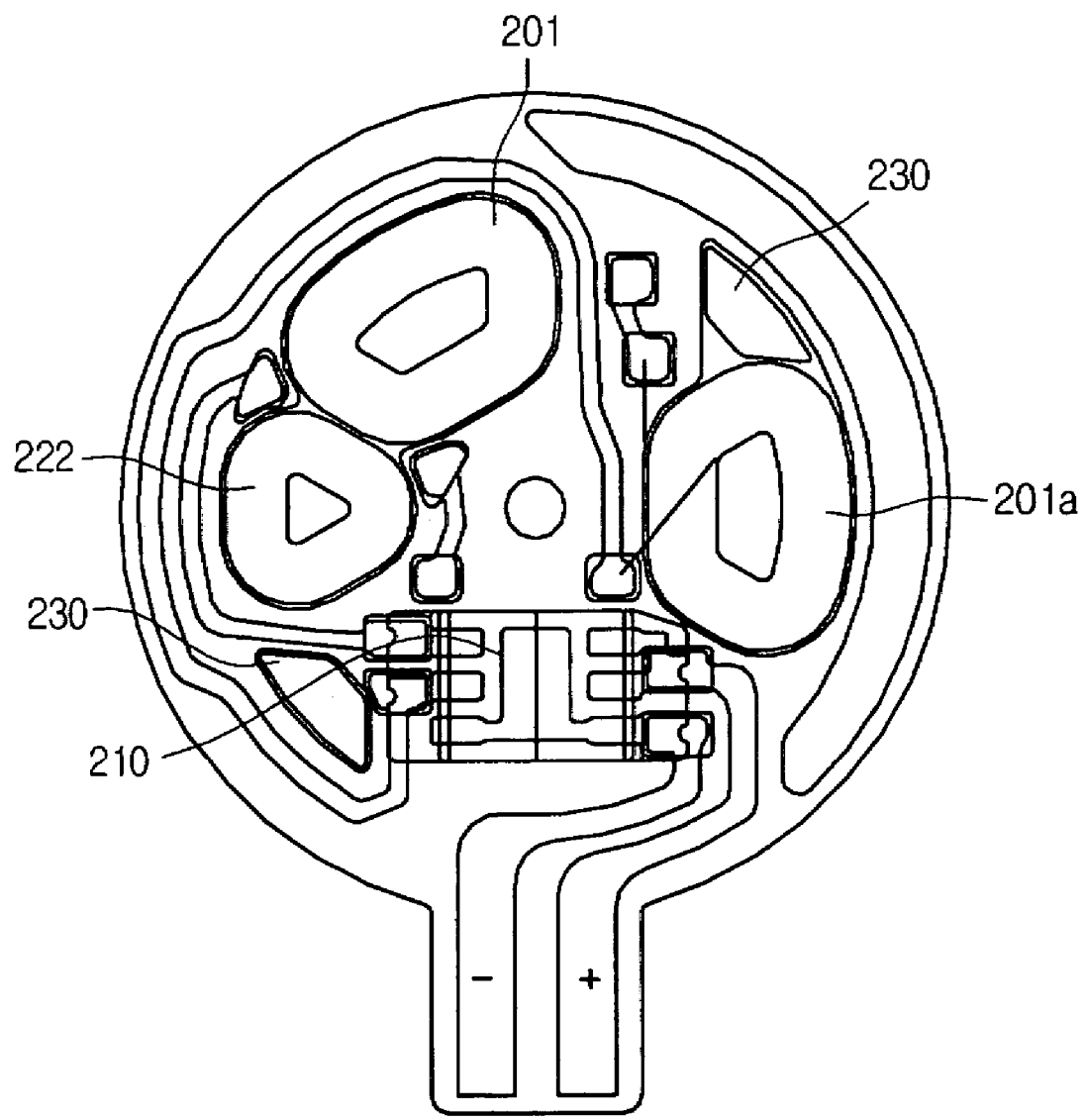
FIG. 8 is a cross-sectional view of a vibrating motor according to further another embodiment of the present invention.

FIG. 8 is a cross-sectional view of a vibrating motor according to further another embodiment of the present invention. The embodiment illustrated in FIG. 8 are mostly similar to the previously embodiment and has differences in arrangements of the primary coils and a Hall sensor. Therefore, parts that are not described in detail will use the descriptions of the corresponding parts of the previous embodiment, and detail description thereof will be omitted.

Referring to FIG. 8, primary coils 201 and 201a are disposed at positions separated different angles from a control IC 210. An auxiliary coil 222 is provided below the primary coil 201 separated a long distance from the control IC 210. Even with this configuration, a vibrating motor can be rotated without limitation by electromagnetic relation of a six-pole magnet.

Also, since the control IC 210 includes a Hall sensor, a separate space for disposing the Hall sensor is not required.

A not explained reference numeral 230 is a detent torque generating unit. A function and an operation of the detent torque generating unit have been already described.

According to the present invention, total resistance of the coil increases, so that battery consumption can be reduced and an apparatus to which a vibrating motor is applied can be driven for a long time. Also, since the number of turns of wirings increases even when a consumed current reduces, torque can be maintained at the same level of the related art.

As described above, according to the present invention, since total resistance of the coil increases and battery consumption can be reduced, an apparatus to which a vibrating motor is applied can be driven for a long time. Furthermore, since the number of turns of wirings increases even when a consumed current reduces, torque can be maintained at the same level of the related art.

Though the detent torque generating unit is suitably applied when a vibrating motor is driven in a single phase, and is not an indispensable element, the detent torque generating unit may be indispensably used when the vibrating motor is driven in a single phase. Furthermore, the bearing may not be indispensably provided as a separate part and thus is not considered as an indispensable element. However, it is preferable that the bearing is used for swift rotation of the rotor, of course.

Also, though the primary coils or the auxiliary coil is provided on an upper side of the substrate according to the above-described embodiments, the primary coils or the auxiliary coil do not need to be provided on the upper side. For example, they can be provided on the lower cover by making a hole in the substrate. This configuration falls on the scope of the present invention.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A flat type vibrating motor comprising:
   a lower cover for protecting a lower portion of the motor;
   an upper cover for protecting an upper portion of the motor;
   a shaft supported by the lower cover and the upper cover;
   a rotor supported by the shaft and having an eccentric center of gravity;
   a magnet fixed on the rotor;
   a substrate provided on an upper surface of the lower cover;
   a Hall device for detecting rotation of the magnet;
   a control integrated circuit for controlling power in response to a detecting signal of the Hall device;
   a plurality of primary coils for receiving power under control of the control integrated circuit; and
   at least one auxiliary coil disposed at a predetermined mechanical degree with respect to at least one of the primary coils and series-connected with the primary coil,
   wherein the plurality of primary coils comprise two coils, and the at least one auxiliary coil comprises a pair of auxiliary coils.

2. The flat type vibrating motor according to claim 1, wherein the plurality of primary coils comprise two coils, and the at least one auxiliary coil comprises one auxiliary coil.

3. The flat type vibrating motor according to claim 1, wherein the auxiliary coil is located at substantially 60° below a line passing through the center of the primary coils.

4. The flat type vibrating motor according to claim 1, wherein the primary coils face each other around the shaft.

5. The flat type vibrating motor according to claim 1, further comprising a detent torque generating unit installed in a dead point area of the rotor, for generating detent torque.

6. The flat type vibrating motor according to claim 5, wherein the detent torque generating unit is installed in an inner space of the primary coil.

7. The flat type vibrating motor according to claim 1, wherein the auxiliary coil is smaller than the primary coils.

8. The flat type vibrating motor according to claim 7, wherein the primary coils comprise two primary coils, and the at least one auxiliary coil comprises one auxiliary coil.

9. The flat type vibrating motor according to claim 8, wherein the primary coils face each other around the shaft.

10. The flat type vibrating motor according to claim 8, wherein one of the primary coils is connected to the auxiliary coil and wherein the auxiliary coil is connected to the other of the primary coils.

11. The flat type vibrating motor according to claim 7, wherein the primary coils comprise two primary coils, and the at least one auxiliary coil comprises two auxiliary coils.

12. The flat type vibrating motor according to claim 11, wherein the primary coils face each other around the shaft.

13. The flat type vibrating motor according to claim 11, wherein one of the primary coils is connected to one of the auxiliary coils, and wherein the one of the auxiliary coils is connected to the other of auxiliary coils, and wherein the other of the auxiliary coils is connected to the other of the primary coils.

14. The flat type vibrating motor according to claim 7, wherein the auxiliary coil is located at substantially 60° below a line passing through the center of the primary coils.

15. The flat type vibrating motor according to claim 7, further comprising a detent torque generating unit installed in a dead point area of the rotor, for generating detent torque.

16. The flat type vibrating motor according to claim 15, wherein the detent torque generating unit is installed in an inner space of one of the primary coils.

17. The flat type vibrating motor according to claim 7, further comprising a Hall device for detecting rotation of the magnet.

* * * * *